Figure 1:
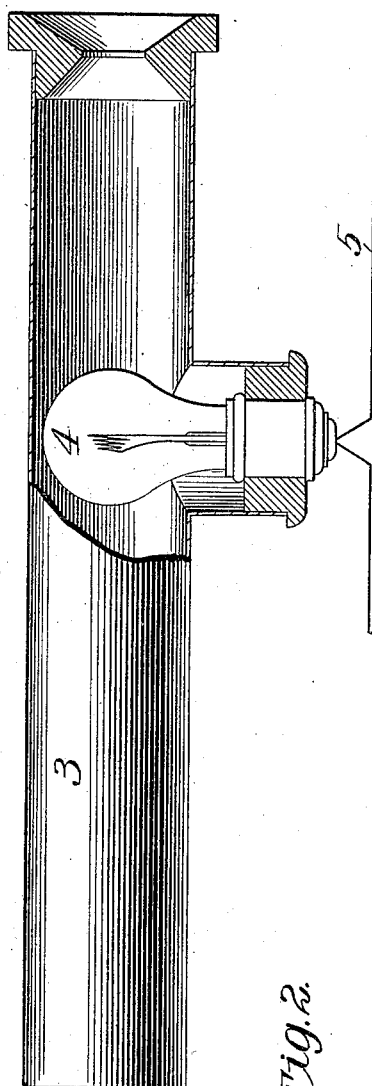

No. 696,878. Patented Apr. 1, 1902.
E. F. MORSE.
METHOD OF GAGING TEMPERATURES OF HEATED SUBSTANCES.
(Application filed Aug. 4, 1899.)
(No Model.)

Witnesses:
C. L. Belcher
M. J. Ludlow

Inventor
Everett F. Morse
By Townsend & Decker
Attorneys

UNITED STATES PATENT OFFICE.

EVERETT F. MORSE, OF TRUMANSBURG, NEW YORK.

METHOD OF GAGING TEMPERATURES OF HEATED SUBSTANCES.

SPECIFICATION forming part of Letters Patent No. 696,878, dated April 1, 1902.

Application filed August 4, 1899. Serial No. 726,101. (No specimens.)

*To all whom it may concern:*

Be it known that I, EVERETT FLEET MORSE, a citizen of the United States, and a resident of Trumansburg, in the county of Tompkins and State of New York, have invented certain new and useful Methods of Gaging Temperatures of Heated Substances, of which the following is a specification.

This invention relates to a novel method for gaging the temperature of a heating or heated substance which becomes luminous when heated.

The object of the invention is to provide for accurately determining the critical degree of temperature to which it is necessary to heat steel, for example, in order to produce the best possible results in hardening or in annealing it, and just as important as the above is its object of enabling a workman to reproduce in every succeeding piece of steel the same result. This is of great importance in manufactories, where it is necessary for economical and other reasons to produce in tools, parts of machines, and other devices uniformity in hardness, malleability, or ductility.

Methods heretofore employed for determining the temperature of heated metals for hardening or annealing have failed in producing uniformity in the things treated and in arriving even infrequently at the best results.

In optical pyrometry the methods heretofore employed have consisted in comparing the substance to be tested with an optical standard arranged at one side of the field of vision of said standard. With this method the observer has to carry mentally from one to the other the color effect of either the substance or standard. The accuracy of the test depends on the skill of the observer, and even with the best skill the effort necessarily exerted to make accurate comparisons by this method is very fatiguing, so much so that time for the eye to rest must be provided between observations. If in addition to thus carrying mentally the color sensation of the standard or substance from one to the other and comparing them the observer has to compensate or make allowance for different optical sensations due to a substantial difference in the size or (to some extent) the shape of the standard and substance, then the accuracy and reliability of the comparisons are greatly impaired.

The above objects have been attained and the above difficulties have been overcome by my method of comparison, which is based on the fact that if two substances are made to produce in the eye the same color effects or sensations and one of them or a portion thereof is arranged in the path of the rays passing from the other to the eye the portion of the one so arranged or superposed will merge in the other and apparently be obliterated from view.

The material selected for the standard may be of different composition from the thing to be tested; but it must produce substantially the same sensation in the eye with respect to color. The merging effect above referred to is a well-defined phenomenon and enables the observer to easily and at once detect when the substance is at the desired temperature, for were the temperature either above or below the temperature indicated by the standard both would be visible, and the difference in color would be sharply defined by the one appearing against the other, for the portion superposed would appear to be a part of the substance which lies beyond it and a part of whose rays it intercepts.

While the advantages of my method are greater when the standard and substance to be tested differ much either in shape or size, the advantage is still great no matter what the standard may be.

If the material is brought to the exact temperature indicated by the standard, the one will be completely merged into the other, and then the temperature is gaged to the highest degree of accuracy of which my method is capable and to a degree of accuracy that is often greater than is required in commercial work. However, my method is almost equally advantageous in gaging approximate temperatures, for if there is a difference in the temperature from that indicated by the standard then the one appears more or less plainly as a bright or dark portion on the other and one is partially merged in the other. In this case with the superposed method the difference in the temperature of the material from that indicated by the standard is then estimated, not by comparing the colors principally, but rather by the degree of distinctness with which the operator is able to see the one superposed. This is very different from the method in side-by-side comparison, where the colors have actually to be compared, while with superposition it is principally only the difference in brightness that is observed.

The method then consists in placing the standard in the path of the rays of light passing to the eye from the thing to be tested or in placing the thing to be tested or a portion thereof in the path of rays of light passing to the eye from the standard, so that the outline of one or a portion thereof shall appear to overlap in whole or in part the field of the other, then bringing the heating substance to a degree of incandescence such that the outline of one or a superposed portion thereof will merge in the other to such a degree as to indicate the correct temperature within the necessary limits, or, if the most exact gaging of temperature is required, then by bringing the heated substance to a degree of incandescence such that the outline of the one or the superposed portion thereof will disappear or become completely merged in the other.

By a standard of substantially the same nature in respect to incandesence as the thing being tested is meant one that when heated to the proper temperature produces upon the eye substantially the same color effects as said heated substance. Such standards may consist of metal wires, carbon filaments, or the like, and are preferably heated to incandescence by means of an electric current flowing through them.

By this invention it is possible for a person of ordinary ability to produce the same desired hardness, malleability, or ductility in every like article, because by it he can accurately determine when each article reaches the critical degree of temperature at which the best results can be produced.

It may be observed that it is not always practicable to vary the temperature of the particular piece being gaged, as is often the case in gaging bars passing through rolls. If in this case the temperature of a bar is either too high or too low, then the furnace may be adjusted so as to correct the temperature of the subsequent bars, the observation enabling the workmen to do this intelligently.

This application treats of the method of gaging temperature. The claims upon the apparatus involved in its use form the subject-matter of a companion application filed November 9, 1899, under Serial No. 736,368.

This invention, therefore, further consists in the method herein fully set forth and specified in the claims.

Figure 2:
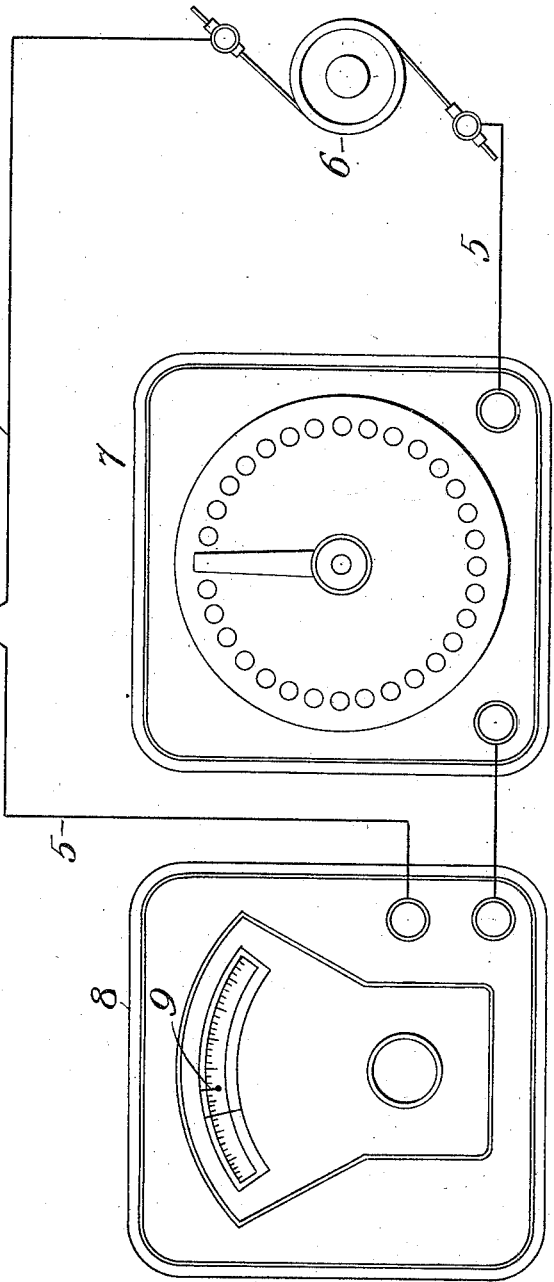
Figure 2:
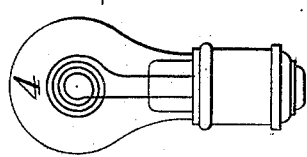

In the accompanying drawings, which form a part of this specification, Figure 1 represents the apparatus for carrying out the invention, and Fig. 2 is another view of the lamp used therein.

The invention may be made effective by means of various apparatus. That illustrated has been found to work perfectly and will serve well the purpose of disclosing the invention. It consists of a tube 3, open at both ends, so that it may be looked through, though both or either end may be closed by any transparent substance, if desired. There is located in the tube in any suitable manner a filament, as 4, which is most conveniently inclosed in a vacuous bulb and constitutes an incandescent lamp. This filament may be of any suitable substance, but is preferably of carbon or platinum, and larger in cross-section than that of the ordinary incandescent lamp. It is also preferably coiled or looped and is included in an electric circuit 5, supplied from a source of current, (indicated at 6,) which is preferably a storage battery, though it may be of any other sort. There is a suitable rheostat in the circuit, as at 7, and a meter or indicator, as at 8, provided with its usual scale. A marker may be employed in the indicator, as represented at 9. This may be set at a predetermined point on the scale at which the index must stand when the apparatus is used for gaging the temperature of a certain batch or class of things to be hardened or annealed. A number of these markers may be employed when the apparatus is to be used on various classes of work requiring heating to different temperatures.

The apparatus may be used as follows: By trial may be found the particular degree of incandescence at which the requisite temperature of the metal is reached. This is observed at the time and the rheostat manipulated to produce the same degree of incandescence in the filament 4 and the marker 9 set or the position of the indicator otherwise noted. The next article to be hardened or annealed may be viewed through the tube 3, and when the temperature reaches the proper degree the degree of incandescence of the article will be the same as that of the filament, and the latter, or at least that portion thereof on which the eye is fixed, will be obliterated or merged in the field of the heated metal. This condition is accurately and decisively determined, because the filament will show light against the heating metal before it reaches the critical temperature and dark against it should the temperature of the metal pass the critical point. In transit from one of these conditions to the other there is a time when the filament or that portion thereof on which the eye is fixed is lost to view. That is the critical moment, and at that instant the metal should be immersed in the hardening-bath or otherwise cooled, as the case may be. Attention is called to the fact that changes in degree of incandescence of a substance produce changes in the shade of color, and the term "incandescence" is used in the claims in this sense. In addition to the employment of this means for producing uniformity in hardening and annealing it serves as a gage in arriving at the temperature which is best suited to produce the desired effect in hardening or annealing any particular thing. If on trial it is found that a certain temperature is not quite high enough, a small amount of resistance may be cut out of the circuit 5, thereby slightly increasing the brilliancy of the filament. The position of the indicator is then noted, and the thing heating is brought to that temperature which will make its degree of incandescence identical with that of the filament. In this way repeated trials may be conducted with accuracy and the best result attained with certainty and despatch. Then when the best result has been attained the same degree of heat may thereafter be reproduced in any number of successive articles or things in which changes in degree of incandescence can be produced by changes in temperature.

The different degrees of incandescence include a range from the faintest original luminosity due to heat to an incandescence of the brightest or whitest light.

By using with an electric current of constant voltage a carefully and minutely graded and graduated rheostat, the indicator, an ammeter or voltmeter, may be dispensed with and the position of the rheostat noted for the various degrees of incandescence in the filament.

Obviously the electrical indicator is made to read in amperes or volts; but it may be calibrated to give readings in degrees of temperature, if desired, and the same device may be made to serve as the standard for various materials or substances. The standard may be then set for a particular degree of temperature, and the substance or material to be treated may be brought to that degree of incandescence which corresponds to that of the standard when so set. Then the temperature of the material will be the same as that for which the standard was set. From this it is obvious that the standard, with its indicator, may also be used to read the temperature of a luminous object.

Other means than the filament shown may be employed as a standard of comparison, and such standard may be mounted in a different manner from that illustrated, and the luminosity of the standard may be effected by other means than by electricity without departing from the invention. Said standard may be any object or material whose appearance is such as to cause it or a portion thereof to merge into the field of said substance when the desired degree of temperature therein is reached; nor is this invention limited in its application to steel or other metals. It is applicable to any and all substances which become luminous when heated.

Obviously more than one testing-tube, with its lamp, may be placed in the same circuit to serve for several different operations. In that case the lamps are preferably placed in parallel and every lamp brought to the color of the dullest one by using with each of the brighter ones sufficient resistance to effect that purpose.

I claim as my invention—

1. The method of gaging the temperature of a material which becomes incandescent when heated, consisting in comparing said material heated to a luminous state with an optical standard, said comparison being made by placing said material and standard so that at least a portion of one is in the path of the rays passing from the other to the eye, observing the standard and material and noting if the one merges in the other to such a degree as to indicate the correct temperature within the necessary limits.

2. The method of gaging the temperature of a material which becomes incandescent when heated, consisting in comparing said material heated to a luminous state with an optical standard, said comparison being made by placing said material and standard so that at least a portion of one is in the path of the rays passing from the other to the eye and varying the degree of heat until the color of one merges in that of the other.

3. The method of gaging the temperature of a material which becomes incandescent when heated, consisting in comparing said material heated to a luminous state with an optical standard, said comparisons being made by placing said material and standard so that at least a portion of the one is in the path of the rays passing from the other to the eye, noting the difference in color between the two whereby it may be readily determined whether the temperature of the material is above or below that indicated by the standard, and increasing or decreasing the heat of the material until the one merges into the other whereby it can easily and at once, be detected when the material is at the desired temperature.

4. The method of gaging the temperature of a material which becomes incandescent when heated, consisting in comparing said material heated to a luminous state, with a standard placed in the path of the rays passing to the eye from said material so that a portion thereof is superposed upon the field of said material, and varying the temperature of the material so that that portion of the standard superposed may be made to merge into the field of said material, thereby showing that the desired temperature thereof has been reached.

5. The method of gaging the temperature of a substance when heated to incandescence, consisting in comparing the degree of incandescence of said substance with a standard which is incandescent simultaneously therewith and incandescent to a degree corresponding to the incandescence of said substance when heated to the desired temperature, said standard being located in the path of the rays passing from the heated substance to the eye.

6. The method of gaging the temperature of a material consisting in comparing it with an optical standard whose color and luminosity correspond to that resulting from a known degree of incandescence or temperature, said comparison being made by placing one of them in the rays passing to the eye from the other so that a portion at least of one will be superposed upon the field of the other, varying the temperature of the material whereby it may be made to agree in color and luminosity with that of the standard and the portion of the one superposed made to merge in the field of the other.

7. The method of determining the temperature of an incandescent substance consisting in placing in the path of the rays passing from the incandescent substance to the eye an incandescent standard and changing the degree of incandescence of said standard until it becomes practically identical with the incandescence of said substance.

Signed at Trumansburg, in the county of Tompkins and State of New York, this 2d day of August, A. D. 1899.

EVERETT F. MORSE.

Witnesses:
 FRANK L. MORSE,
 DAVID B. PERRY.